(12) United States Patent
Van Leeuwen et al.

(10) Patent No.: US 12,731,419 B2
(45) Date of Patent: Sep. 8, 2026

(54) SYSTEM FOR CO-REGISTRATION OF MEDICAL IMAGES USING A CLASSIFIER

(71) Applicant: KONINKLIJKE PHILIPS N.V., Eindhoven (NL)

(72) Inventors: Marinus Bastiaan Van Leeuwen, Eindhoven (NL); Koen De Laat, Udenhout (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 531 days.

(21) Appl. No.: 17/284,852

(22) PCT Filed: Oct. 14, 2019

(86) PCT No.: PCT/EP2019/077749
§ 371 (c)(1),
(2) Date: Apr. 13, 2021

(87) PCT Pub. No.: WO2020/078888
PCT Pub. Date: Apr. 23, 2020

(65) Prior Publication Data

US 2021/0390278 A1 Dec. 16, 2021

(30) Foreign Application Priority Data

Oct. 15, 2018 (EP) .................................... 18200520

(51) Int. Cl.
*G06V 20/69* (2022.01)
*G06T 7/00* (2017.01)
(Continued)

(52) U.S. Cl.
CPC .......... *G06V 20/695* (2022.01); *G06T 7/0012* (2013.01); *G06T 7/11* (2017.01);
(Continued)

(58) Field of Classification Search
None
See application file for complete search history.

(56) References Cited

U.S. PATENT DOCUMENTS 8,229,194 B2 7/2012 Grunkin
9,607,379 B1 3/2017 Potts
(Continued)

FOREIGN PATENT DOCUMENTS

EP 2608150 A2 6/2014

OTHER PUBLICATIONS

Trahearn, Nicholas, et al. "Hyper-stain inspector: a framework for robust registration and localised co-expression analysis of multiple whole-slide images of serial histology sections." Scientific Reports 7.1 (2017): 5641. (Year: 2017).*
(Continued)

*Primary Examiner* — Vincent Rudolph
*Assistant Examiner* — Meredith Taylor

(57) ABSTRACT

Disclosed is a system for analysis of microscopic image data representing a plurality of images acquired from cells. The system comprises a data processing system which is configured to read and/or generate (120) segmentation data for each of the images. For each of the images, the segmentation data are indicative of a segmentation of at least a portion of the respective image into one or more image regions so that each of the image regions is a member of one or more predefined classes of image content. The data processing system further generates co-registration data using at least portions of the segmentation data for co-registering at least portions of different ones of the images. The data processing system further generates mapping data using at least portions of the segmentation data for mapping between image regions of different images.

14 Claims, 7 Drawing Sheets

(51) Int. Cl.
*G06T 7/11* (2017.01)
*G06T 7/30* (2017.01)

(52) U.S. Cl.
CPC .............. *G06T 7/30* (2017.01); *G06V 20/698* (2022.01); *G06T 2207/10056* (2013.01); *G06T 2207/20081* (2013.01); *G06T 2207/20084* (2013.01); *G06T 2207/30024* (2013.01)

(56) References Cited

U.S. PATENT DOCUMENTS

| | | | |
|---|---|---|---|
| 10,885,605 B2 | 1/2021 | Van Leeuwen | |
| 2013/0016886 A1 | 1/2013 | Schoenmeyer | |
| 2014/0376824 A1* | 12/2014 | Levenson | G06F 18/21 382/228 |
| 2016/0232425 A1 | 8/2016 | Huang | |
| 2016/0335478 A1 | 11/2016 | Brendo | |

OTHER PUBLICATIONS

Xu Y, Jia Z, Wang LB, Ai Y, Zhang F, Lai M, Chang El. Large scale tissue histopathology image classification, segmentation, and visualization via deep convolutional activation features. BMC bioinformatics. Dec. 2017; 18:1-7. (Year: 2017).*

B. Ehteshami Bejnordi et al., "Deep learning-based assessment of tumor-associated stroma for diagnosing breast cancer in histopathology images," 2017 IEEE 14th International Symposium on Biomedical Imaging (ISBI 2017), Melbourne, Vic, Australia, 2017, pp. 929-932, doi: 10.1109/ISBI.2017.7950668. (Year: 2017).*

PCT International Search Report, International application No. PCT/EP2019/077749, Jan. 16, 2020.

Shamonin D.P. et al., "Fast Parallel Image Registration on CPU and GPU for Diagnostic Classification of Alzheimer's Disease", Journal Frontiers in Neuroinformatics, Jan. 2014, vol. 7, article 50, pp. 1-15.

Mehta S. et al., "Learning to Segment Breast Biopsy Whole Slide Images", https://arxiv.org/abs/1709.02554, Sep. 8, 2017.

Lowe D.G. et al., "Distinctive Image Features from Scale-Invariant Keypoints", International Journal of Computer Vision, vol. 60(2), pp. 91-110, 2004.

El-Baz A. et al., "Modality State-of-the-Art Medical Image Segmentation and Registration Methodologies, vol. 1", In: "Modality State-of-the-Art Medical Image Segmentation and Registration Methodologies, vol. 1", Jan. 1, 2011, Springer, XP055655390.

Trahearn N. et al., "Hyper-Stain Inspector: A Framework for Robust Registration and Localised Co-Expression Analysis of Multiple Whole-Slide Images of Serial Histology Sections", Scientific Reports, vol. 7, No. 1, Jul. 17, 2017, XP055576458.

Ruifrok A. et al., "Quantification of Histochemical Staining by Color Deconvolution", Journal of Analytical and Quantitative Cytology and Histology, vol. 23, No. 4, pp. 291-299, 2001.

Macenko A.M. et al., "A Method for Normalizing Histology Slides for Quantitative Analysis", Journal Proceedings of the Sixth IEEE International Conference on Symposium on Biomedical Imaging: from Nano to Macro, pp. 1107-1110, 2009.

Long J. et al., "Fully Convolutional Networks for Segmantic Segmentation", 2015 IEEE Conference on Computer Vision and Pattern Recognition (CVPR), pp. 3431-3440.

Fu X. et al., "Segmentation of Histological Images and Fibrosis Identification with a Convolutional Neural Network", Computers in Biology and Medicine, York, NY, US, vol. 98, May 16, 2018 (May 16, 2018), pp. 147-158, XP085408031.

Wang J. et al., "A Deep Learning Approach for Semantic Segmentation in Histology Tissue Images", Medical Image Computing and Computer-Assisted Intervention—MICCAI 2016, Oct. 17, 2016 (Oct. 17, 2016), pp. 176-184, XP055576467.

Ruqayya A. et al., "Deep Autoencoder Features for Registration of Histology Images", Communications in Computer and Information Science, vol. 894, Jul. 9, 2018 (Jul. 9, 2018), pp. 371-378, XP055576471.

* cited by examiner

SYSTEM FOR CO-REGISTRATION OF MEDICAL IMAGES USING A CLASSIFIER

CROSS-REFERENCE TO RELATED APPLICATIONS

This patent application claims the priority benefit under 35 U.S.C. § 371 of International Patent Application no. PCT/EP2019/077749, filed Oct. 14, 2019, which claims the benefit of European Patent Application No. EP18200520.7, filed on Oct. 15, 2018. These applications are hereby incorporated by reference herein in their entirety.

FIELD OF THE INVENTION

The present invention relates to a system and method for co-registration of medical images. In particular, the present invention relates to a system and method for performing the co-registration using a classifier, in particular an artificial neural network.

BACKGROUND OF THE INVENTION

Tissue pathology is a cornerstone in cancer diagnosis and prognosis. In conventional techniques of cancer diagnosis and prognosis, pathologists visually review stained slides of cancer biopsy samples and assign scores to the detected tumors. This process, however, is time-consuming and the results are often inconsistent across pathologists.

Computer-assisted quantitative analysis of stained histology images has been made particularly efficient through whole slide scanners, which allow acquisition of high resolution digital scans of entire microscopic slides. Such scanners can rapidly generate ultra-large 2D images of a whole tissue sample for digitization of histological slides. Automatic image processing procedures can then be applied to extract structures of interest from the original image for use in diagnosis or prognosis. This area has become widely known as digital pathology and supports manual subjective and time-consuming scoring of data by traditional pathologist assessment. The image processing procedures can automatically detect cells and tissue types and have become very powerful with the aid of deep convolutional neural network technology. Similar problems occur in the assessment of cytological images.

Typically, several tissue slides are taken from a same biopsy specimen or resection specimen. The tissue slides may be stained using different stains for performing different analysis procedure for inspecting the tissue specimen. In other examination procedures, the same tissue slides is first stained using a first stain and later re-stained using a second stain. In these procedures, it is often desirable to efficiently and reliably co-register medical images, since this can simplify the interpretation of information captured in multiple tissue slices of the same biopsy sample.

Therefore, a need exists for efficiently analyzing images acquired from cells.

SUMMARY OF THE INVENTION

Embodiments of the present disclosure pertain to a system for analysis of microscopic image data representing a plurality of images acquired from cells. The system comprises a data processing system, which is configured to read and/or generate segmentation data for each of the images. For each of the images, the segmentation data are indicative of a segmentation of at least a portion of the respective image into one or more image regions so that each of the image regions is a member of one or more predefined classes of image content. The data processing system is further configured to: (a) generate co-registration data using at least portions of the segmentation data for co-registering at least portions of different ones of the images; and/or to (b) generate mapping data using at least portions of the segmentation data for mapping between image regions of different images.

The data processing system may include a computer system having a processor and a memory for storing instructions processable by the processor. The processor may execute an operating system. The data analysis system may further include a user interface configured to allow a user to receive data from the data processing system and/or to provide data to the data processing system. The user interface may include a graphical user interface.

The data processing system may include a display device and may be configured to display to the user the region of interest and/or one or more graphical representations determined depending on medical images, depending on the co-registering data and/or depending on the mapping data. Specifically, the graphical representations may be visually indicative of one or more parameters of the co-registering data and/or the mapping data. Thereby, the user is enabled to check and/or to refine the co-registering data and/or the mapping data. Further, the user is enabled to compare the medical images in order to inspect the sample from which the images are acquired. By way of example, the graphical user interface may present on the display graphical representations of two or more of the images in an overlaid fashion so as to present the co-registration data to the user in a visibly perceptible fashion.

Additionally or alternatively, the system may include an image acquisition unit for acquiring the image data. The image acquisition unit may be configured as a microscope. The microscope may be a scanner, in particular a microscope slide scanner. The microscope may be configured for transmission and/or reflectance imaging. The image is acquired from a tissue sample. The tissue sample may be obtained from a human or animal body region. The image data may include greyscale image data and/or color image data. The image data may show cells and/or tissue portions. The microscopic image data may have a resolution sufficient to determine the position and/or the shape of a cell nucleus having a diameter of 5 micrometers. The microscopic image data may have a resolution better than 5 micrometers or better than 3 micrometers or better than 2 micrometers.

The images may be acquired from a tissue sample which is taken from biopsy or resection material. Thereby, the system may be used for inspection of histopathological images. However, it is also conceivable that the images are acquired from a smear such as a Pap smear. the Pap smear may be prepared on a microscope slide.

According to an embodiment, the generation of the mapping data includes determining, for each of the image regions, an identification parameter for identifying the respective image regions from among further image regions contained in the same image. The identification parameter may be determined depending on the segmentation data.

According to an embodiment, a magnification of the segmentation data is lower than a magnification of the image data. The magnification of the image data and/or the magnification of the segmentation data may be measured in units of length per pixel. A magnification of 40× may correspond to 0.25 micrometer per pixel. A magnification of the image data of the image may be within a range of 2.5× and 15× or within a range of between 2.5× and 12× or within a range of between 2.5× and 10×.

According to a further embodiment, the data processing system is further configured to decrease a magnification of at least a portion of the segmentation data to obtain reduced-magnification segmentation data. The data processing system may further be configured to generate the co-registration data and/or the mapping data using the reduced-magnification segmentation data. Additionally or alternatively, the data processing system may include a classifier which includes an artificial neural network and which is configured to generate the segmentation data depending on the image data. An output of the artificial neural network, which is output by an output layer of the classifier, may be segmentation data having a reduced magnification compared to the image data, which is input to an input layer of the artificial neural network. The segmentation data, which is output by the artificial neural network and which has the reduced magnification may further be processed by the data processing system to further decrease the magnification of the segmentation data before determining the co-registration data and/or the mapping data.

By way of example, the magnification of the segmentation data, which is used for generating the co-registration data and/or the mapping data, may be less than 80% or less than 60% or less than 50% or less than 30% the magnification of the image data which is segmented for obtaining the segmentation data. The magnification of the segmentation data may be more than 0.01%, or more than 0.1%, or more than 1%, or more than 2%, or more than 5%, or more than 7% or more than 10% of the magnification of the image data. By way of example, if the magnification of the images is 40× and the magnification of the segmentation data is 0.15×, the magnification of the segmentation data is 0.0375% of the magnification of the image data.

According to a further embodiment, the segmentation data include, for each of a plurality of pixels of the images, binary or probabilistic pixel classification data for providing a pixelwise classification of the pixels into one or more of the pre-defined classes. Probabilistic classification data may be defined as data which include one or more probability values for one or more of the predefined classes. Binary classification data may be defined as data which include for one or more of the predefined classes, either a value which indicates that the pixel is a member of the class or a value that the pixel is not a member of the class.

According to a further embodiment, the data processing system includes a classifier which is based on supervised and/or unsupervised learning. The classifier may be configured for performing at least a portion of a segmentation of the image data. The segmentation may generate the segmentation data using at least a portion of the image data.

According to a further embodiment, the classifier includes an artificial neural network (ANN). The artificial neural network may include an input layer, one or more intermediate layers and an output layer. The artificial neural network may be configured as a convolutional neural network, in particular as a deep convolutional neural network. Specifically, the ANN may be configured as a fully convolutional ANN.

The image data, which is inputted into the classifier, in particular the image data, which is inputted into the ANN, may include RGB image data and/or may include or represent a hematoxylin and eosin (H&E) stained image. Based on the H&E stained image, the classifier may be configured to determine an amount of hematoxylin stain and an amount of eosin stain using color deconvolution.

The color deconvolution may be configured to perform a separation of the stains of the H&E stain. The separation may be performed using an orthonormal transformation of the image data, in particular an orthonormal transformation of RGB image data of the image data. The orthonormal transformation may be configured to generate, for each of the stains of the H&E stain, one or more separate values, which are indicative of a contribution of the respective stain to the image data. The orthonormal transformation may be normalized. The normalization may be configured to achieve a balancing of the absorption factor for each of the stains.

Examples for color deconvolution algorithms, which can be used for the embodiments of the present disclosure, are described in the article "Quantification of histochemical staining by color deconvolution", published in the journal "Analytical and Quantitative Cytology and Histology", vol. 23, no. 4, pp. 291-299, 2001 and written by A. Ruifrok and D. Johnston, the contents of which is incorporated herein by reference in its entirety and for all purposes. Specifically, the embodiments described in the present disclosure may be configured to implement the color deconvolution described in the section "Theory" of the above publication of Ruifrok.

Further examples for color deconvolution algorithms, which can be used for the embodiments of the present disclosure, are described in the publication "A method for normalizing histology slides for quantitative analysis", published in the journal "Proceedings of the Sixth IEEE international conference on Symposium on Biomedical Imaging: From Nano to Macro", pp. 1107-1110, 2009, and written by A. M. Macenko et al. The contents of this publication is incorporated herein by reference in its entirety and for all purposes.

On the other hand, it is also conceivable that the color convolution step is omitted and the image data (such as RGB image data) is directly used as input for the ANN. The system may be configured to preprocess the image data (such as RGB image data) before inputting the image data into the color deconvolution process or the ANN. By way of example, the preprocessing includes noise removal.

Further, it is also conceivable that the ANN is configured to perform the color deconvolution. Specifically, the ANN may be trained to perform the color deconvolution step as well as the classification step.

The classifier, in particular the ANN, may be configured to perform sliding window classification. The classifier, in particular the ANN, may be configured to separately generate segmentation data for each of a plurality of image portions in a sequential manner. Each of the image portions may be a rectangular-shaped, in particular a square-shaped image portion, which corresponds to the window of the sliding window classifier. For each of the image portions, the segmentation data may be generated in a fully convolutional manner. Each of the image portions may overlap with at least a further one of the image portions. By way of example, the height and/or the width of each of the image portions has a value between 1,000 pixels and 4,000 pixels. An example for a sliding window classification, which may be used for the embodiments described in this disclosure, is given in the article "Fully Convolutional Networks for Segmantic Segmentation", which is a conference paper published in the "2015 IEEE Conference on Computer Vision and Pattern Recognition (CVPR)", pp. 3431-3440 and written by Jonathan Long, Evan Shelhamer and Trevor Darrel. The contents of this publication is incorporated herein in its entirety and for all purposes. It has been shown that the shift and stich step, which is described in this publication can be omitted.

The ANN may have a field of view in the image data, which corresponds to a rectangular-shaped or square-shaped group of pixels. Each of the groups of pixels may overlap with at least a further group of pixels. By way of example, the width and/or the height of the group of pixels may be less than 100 pixels or less than 80 pixels, such as 57×57 pixels. Generating the segmentation data may include classifying each of the groups of pixels. For each of the groups of pixels, the classification of the respective group includes generating binary or probabilistic classification data, which classifies the respective group of pixels into one or more of the predefined classes of image content. The ANN may include an input layer and an output layer and at least one block of layers, which is between the input layer and the output layer. The block of layers includes one, two or more layer groups, each of which including a convolution layer, a batch normalization layer and a non-linear activation layer. In the layer groups, the convolution layer may be arranged upstream of the batch normalization layer, which in turn may be arranged upstream of the non-linear activation layer. However, for each of the groups, also other orders are conceivable. The groups may have the same order, however, it is also conceivable that the groups have different orders. Each of the block of layers may further include a spatial dropout layer, which is arranged downstream of the one or more layer groups of the respective block. Between the block of layers and the output layer, a softmax layer may be arranged. Between the softmax layer and the block of layers, a further layer group consisting of a convolution layer, a batch normalization layer and a non-linear activation layer may be arranged.

The ANN may include more than one blocks of layers, each of which being in one of the configuration as described above, wherein the configurations of the blocks may be the same or may be different from each other. Between each pair of the block of layers, a max-pool layer may be arranged.

According to a further embodiment, at least one of the one or more predefined classes is a class representing image regions formed by one or more types of tissue.

According to a further embodiment, the one or more predefined classes comprise one or a combination of: a class representing image regions formed by fatty tissue; a class representing image regions which are free from sample material; and a class representing image regions formed by non-fatty tissue.

According to a further embodiment, the image regions, for which the mapping data are generated, represent isolated tissue portions.

The isolated tissue portions may be separated from each other by regions which are free from tissue. In each of the image regions, the isolated tissue portions may be visible as mutually non-connected tissue portions. In other words, each of the tissue portions may be surrounded by a region which represents a region free from tissue or free from sample material.

According to a further embodiment, the data processing system comprises a graphical user interface. The data processing system may be configured to present to the user a graphical representation which is visually indicative of one or more parameters of the co-registration data and/or one or more parameters of the mapping data.

According to a further embodiment, the data processing system is configured to use the mapping data to generate the co-registration data.

According to a further embodiment, the system further comprises an image acquisition unit which is configured to receive one or more samples, each of which comprising the cells. The image acquisition unit may be further configured to acquire the image data from the one or more samples.

Embodiments of the present disclosure pertain to a method for analyzing microscopic image data using a data processing system. The method comprises reading and/or generating, by the data processing system, segmentation data for each of the images. For each of the images, the segmentation data are indicative of a segmentation of at least a portion of the respective image into one or more image regions so that each of the image regions is a member of one or more predefined classes of image content. The method further comprises at least one of: (a) generating co-registration data using at least portions of the segmentation data for co-registering at least image portions of different ones of the images; and/or (b) generating mapping data using at least portions of the segmentation data for mapping between image regions of different images.

According to an embodiment, the method further includes generating a first image of the images and a second image of the images, wherein the first image shows a sample being stained using a first stain and the second image shows a different and/or the same sample being stained using a second stain. The first and the second image may show different sample stainings.

According to a further embodiment, the first stain includes H&E and the second image is stained using immunohistochemistry.

The present disclosure further pertains to a program element for analysis of microscopic image data acquired from cells. The analysis is performed using a data processing system. The program element, when being executed by a processor of the data processing system, is adapted to carry out: reading and/or generating, by the data processing system, segmentation data for each of the images. For each of the images, the segmentation data are indicative of a segmentation of at least a portion of the respective image into one or more image regions so that each of the image regions is a member of one or more predefined classes of image content. The program element, when being executed by a processor of the data processing system, is adapted to carry out: (a) generating co-registration data using at least portions of the segmentation data for co-registering at least image portions of different ones of the images; and/or (b) generating mapping data using at least portions of the segmentation data for mapping between image regions of different images.

The present disclosure further pertains to a computer readable medium having stored thereon the computer program element described herein.

DESCRIPTION OF EMBODIMENTS

Figure 1:
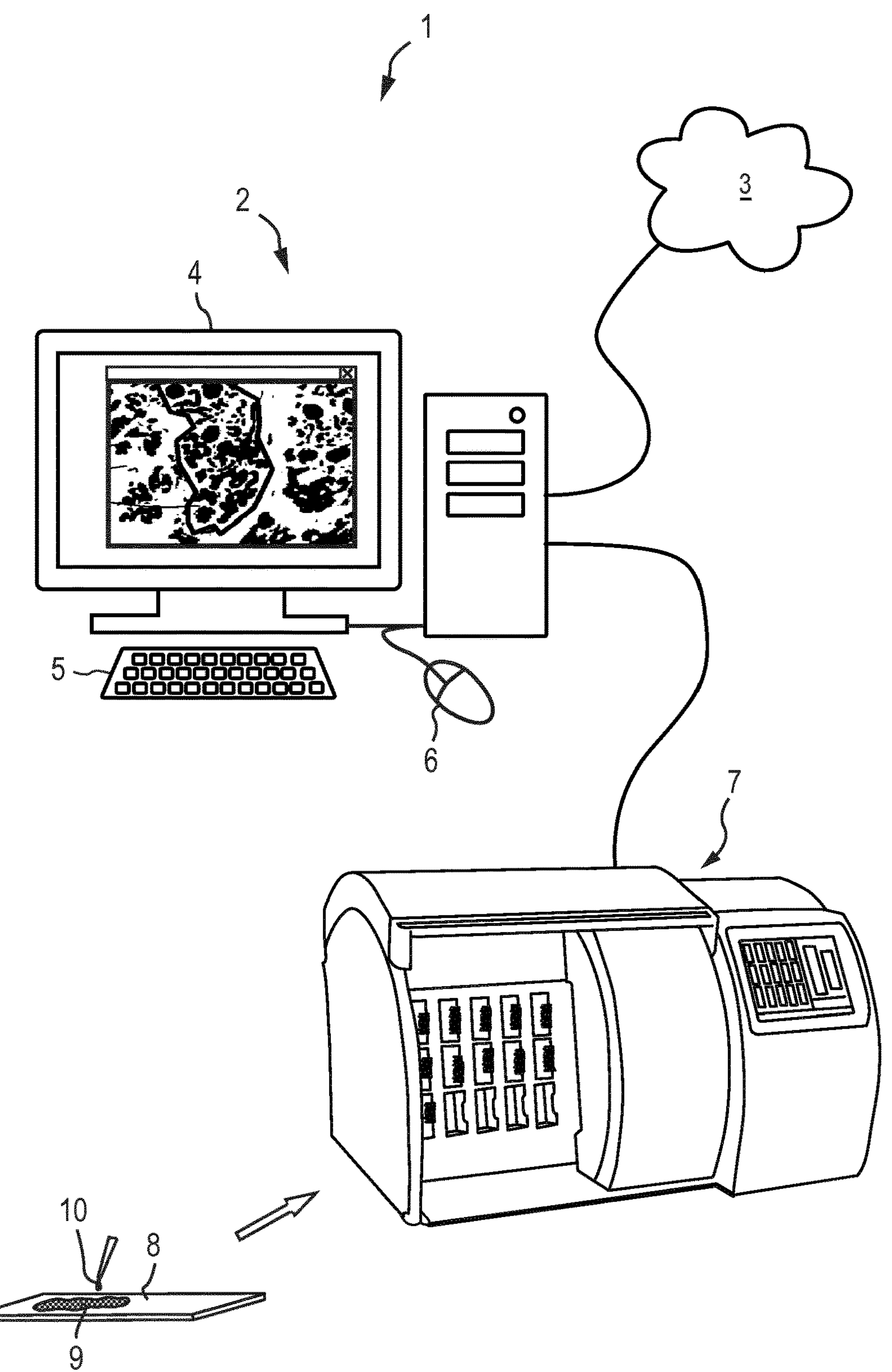
FIG. 1 is a schematic illustration of a system for analysis of microscopic image data according to a first exemplary embodiment.

FIG. 1 schematically illustrates a system 1 for analysis of microscopic image data acquired from cells according to an exemplary embodiment. The system 1 includes a data processing system 2 which is configured as a stand-alone computer. However, it is also conceivable that the data processing system 2 is configured as a distributed computer system which uses a computer network 3, such as the Internet or a local area network (LAN). The data processing system 2 includes a display device 4, and input devices, such as a keyboard 5 and a computer mouse 6 allowing user interaction via a graphical user interface of the data processing system 2.

The data processing system 2 is configured to read microscopic image data generated using an image acquisition unit 7. In the exemplary embodiment, the image acquisition unit 7 is a microscope slide scanner, such as a whole slide scanner, which is configured to acquire an image of cells which are deposited on a microscope slide 8. It is to be understood that the invention is not limited to slide scanners. It is also conceivable that other types of microscope systems are used for acquiring the microscopic image data. The image data may include greyscale image data and/or color image data.

The object 9 may be a tissue slice taken from biopsy or resection material so that the system 1 is used for inspection of histopathological images. However, it is also conceivable that the object 9 is a smear such as a Pap smear which is prepared on the microscope slide 8.

As is further illustrated in FIG. 1, before the image is acquired, the object 9 is stained using a stain 10, such as for example H&E stain, in order to distinguish between cells with different morphological appearance. An alternative stain is immunohistochemistry (IHC) stain, which involves the process of selectively imaging antigens (proteins) in cells of a tissue section by exploiting the principle of antibodies binding specifically to antigens in biological tissues, which allows to discriminate between cells having a similar appearance. The present disclosure is, however, not limited to these stains and other staining procedures are conceivable.

The image data which have been acquired using the image acquisition unit 7 are analyzed by a classifier of the data processing system 2 to perform a pixelwise classification of the image data. Through pixelwise classification, segmentation data are obtained which include, for each of the pixels of the image data, binary or probabilistic classification data. Probabilistic classification data indicate for one or more of the predefined classes a probability that the pixel is part of a region which is a member of the respective class. Binary classification data indicate for one or more of the predefined classes that the pixel is or is not part of a region which is a member of the respective class. At least one of the predefined classes may be a class representing image regions formed by one or more types of tissue, such as a class representing image regions formed by fatty tissue. In the exemplary embodiment, the predefined classes include a class representing image regions formed by fatty tissue, a class representing image regions which are free from sample material and a class representing image regions formed by non-fatty tissue.

An additional class may be provided for pixels, which have only one or more low values (low compared to a value of 1) of probabilistic classification data for one or more of the remaining classes (i.e. no significant probability values for any one of the remaining classes). This additional class therefore represents a class "unknown". By doing so, the uncertainty about the class type remains visible for future inspection. By way of example, in a first image, a tissue piece with 50% fat and 50% other tissue is identified, and in a second image, there is no tissue piece having these characteristics and a piece with 30% fat, 50% other tissue, and 20% of this additional class ("unknown") is found, then, there is a comparatively high probability that these pieces match and this 20%, which was classified as "unknown", was actually fatty tissue.

Figure 2:
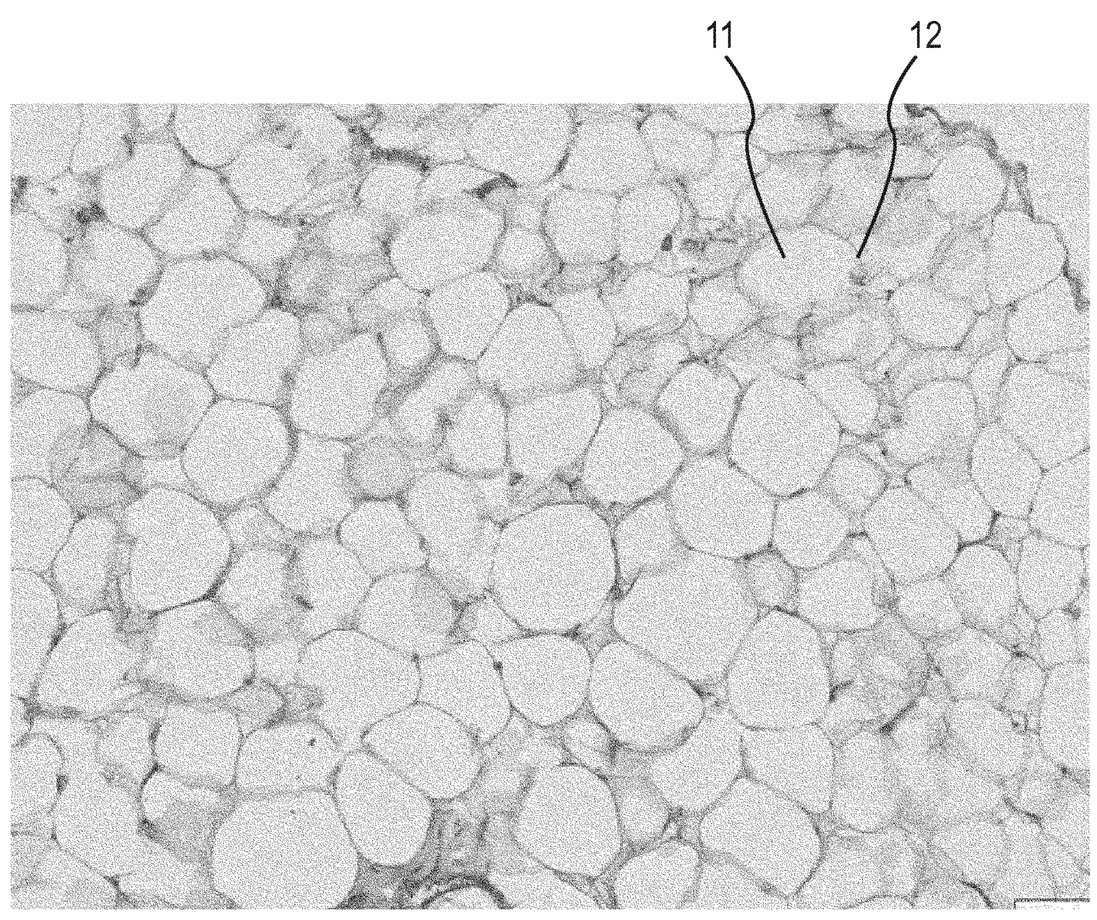
FIG. 2 is a schematic illustration of a portion of fatty tissue wherein fatty tissue is a class for segmenting image data performed by the system according to the first exemplary embodiment shown in FIG. 1.

Fatty tissue (also denoted as adipose tissue) can be defined as tissue which is predominantly composed of Adipocytes (fat cells). These cells are specialized in storing energy as fat. FIG. 2 shows a group of fat cells 11 within fatty tissue. Fat cells 11 are comparatively large cells, which contain fat which—as can be seen from FIG. 2—is enclosed by a smooth and thin cell wall 12. After substantially all sample preparation procedures, which are widely applied in digital pathology (such as staining with H&E and IHC), the fatty content is typically removed, leaving only the thin cell wall so that the remaining structure of fat tissue is substantially independent from the applied sample preparation procedure. As is explained in the following, this can advantageously be used for co-registering images even in situations where images are compared to which different sample preparation procedures (such as different stains) have been applied. The inventors have further found that such a method for co-registering the images also lead to robust results even in situations where images of tissue slices are compared which represent widely separated portions of the biopsy sample or if the shape of the tissue slices is modified (e.g. by damaging the tissue slices so that tissue is torn or by generating tissue folds) during the sample preparation process. In case of neighboring tissue slices, the correspondence in morphology already starts de to differ at nucleus level because some of the nuclei might be present in one slice and not be present in the neighboring slice. If the distance between the two slices increases, the level of detail at which correspondences are observed moves to the coarser structures. In other words, the magnification level at which morphological correspondences are observed will become lower.

Figure 3A:
FIGS. 3A and 3B are schematic illustrations of segmentation data retrieved from images which show tissue slices taken from a same biopsy specimen, the segmentation data being used by the system according to the first exemplary embodiment shown in FIG. 1 for generating co-registering data and/or mapping data.
Figure 3B:
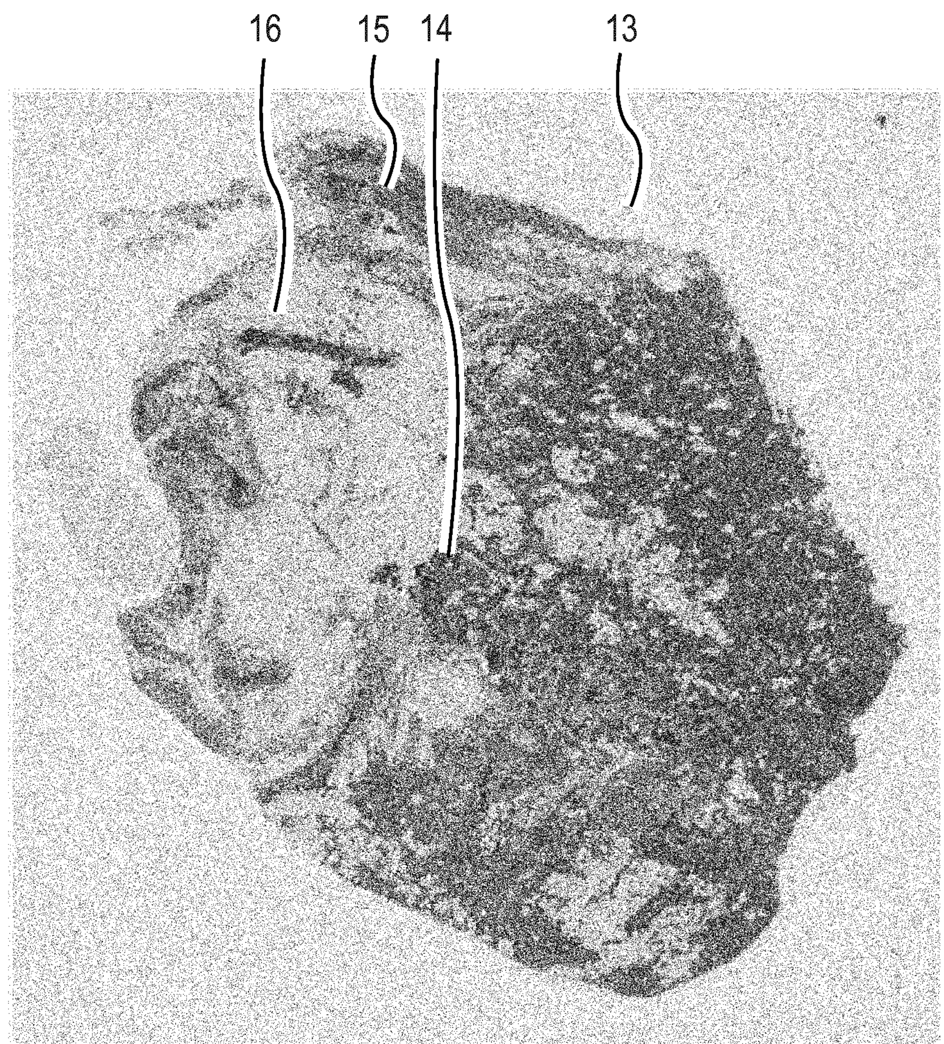

FIGS. 3A and 3B are each illustrations of segmentation data obtained from a respective tissue slice, which was stained using H&E, wherein both tissue slices were taken from a same biopsy sample. In images which are stained using H&E, contrast between tissue structures are visualized using a combination of pink (Eosin) and blue (Heamatoxylin) dyes. Since the tissue slices are not identical, the appearance of color and contrast of tissue structures can differ very much in appearance when looking solely at the stained samples. Therefore, conventional techniques of registration tend to fail because of insufficient number of corresponding features.

Each of FIGS. 3A and 3B are images based on four grayscale values, wherein each of the grayscale values represents one of four predefined classes. The predefined classes which were used to segment the images of FIGS. 3A and 3B included a first class representing image regions of background and artifacts (designated with reference numeral 13 and displayed using the brightest grayscale shading), a second class representing image regions formed by epithelium tissue (designated with reference numeral 14 and displayed using the darkest grayscale shading), a third class which includes image regions formed by connective tissue except fatty tissue (designated with reference numeral 15 and displayed using an intermediate grayscale shading) an a fourth class which includes image regions formed by fatty tissue (designated with reference numeral 16 and displayed using an intermediate grayscale shading, which is darker than the grayscale shading used for the connective tissue).

It is conceivable that the classifier is trained on samples representing different sample stainings (such as sample stainings with H&E and sample stainings with IHC). Alternatively, one or more classifiers may be provided, each of which being trained on one of the sample stainings.

As can be seen by comparing the segmentation data shown in FIGS. 3A and 3B, the extent of the image region 16 formed by fatty tissue in FIG. 3A, is highly similar to the corresponding image region 16 formed by fatty tissue in FIG. 3B. It has been shown by the inventors that this high degree of similarity allows to accurately determine co-registration data by using portions of the segmentation data, which are indicative of the fatty tissue.

The co-registration data may include one or more parameters of a position and/or orientation of the images relative to each other. Specifically, the co-registration data may include one or more parameters of a translation vector and/or a rotation angle between the images. It has further been shown by the inventors that a sufficiently high accuracy can be obtained if tissues other than fatty tissues are used for determining the co-registration data.

As can also be seen by comparing the segmentation data of FIGS. 3A and 3B, also the class for background and artifacts (designated with reference numeral 13) has a high degree of similarity.

The inventors have further shown that using one or a combination of the following classes is particularly advantageous for obtaining highly accurate co-registration data which are robust to variations in sample preparation protocols: a first class which represents image regions which are free from sample material, a second class which represents image regions formed by non-fatty tissue and a third class which represents image regions which are formed by fatty tissue.

The inventors have found that the more classes can be distinguished consistently in both images, the higher the accuracy and/or robustness that can be achieved.

As has been illustrated by the images of FIGS. 3A and 3B, the binary or probabilistic pixel classification data of an image can be considered as a classification image, wherein each pixel of the classification image has one or more pixel data values which are indicative of the one or more classes (or the probability values for the one or more classes) to which the respective pixel is assigned. The inventors have found, that it is advantageous to generate a demagnified classification image based on which the co-registration data and/or the mapping data (generation of mapping data is explained further below in connection with FIGS. 5A and 5B) depending on the classification data. Thereby, it is possible to significantly reduce the computational effort, which is necessary to determine the co-registration data and/or mapping data based on the segmentation data. Furthermore, the demagnified classification image reduces small structures, which are less useful for determining the co-registration data and/or the mapping data which are explained further below in connection with FIGS. 5A and 5B.

By way of example, the magnification of the segmentation data, which is used for generating the co-registration data and/or the mapping data, may be less than 80% or less than 60% or less than 50% or less than 30% the magnification of the image data. The magnification of the segmentation data may be more than 0.01%, or more than 0.1%, or more than 1%, or more than 2%, or more than 5%, or more than 7% or more than 10% of the magnification of the image data.

As will be described in detail further below, the binary or probabilistic pixel classification data are generated using a machine learning classifier. The classifier may be configured so that the output image of the classifier (such as the image outputted by the output layer of an artificial network), represents the demagnified pixel classification data. In other words, the steps of classification and demagnification are performed simultaneously (e.g. by the layers of the artificial neural network). Additionally or alternatively, the demagnification may be performed after the step of classification has been completed and before the step of determining the co-registration data and/or the mapping data depending on the segmentation data. By way of example, the demagnification may be performed by averaging (probabilistic or binary) pixel classification data of those pixels which are assigned to a same pixel of the demagnified classification image. However, additionally or alternatively, other procedures for demagnifying image data can be applied for generating the demagnified pixel classification image.

It is further conceivable, that the segmentation data do not represent a pixelwise classification (i.e. a classification on the pixel level). By way of example, the segmentation data may define boundaries of one or more segmented image regions. The image region boundaries may be defined using coordinates (such as coordinates of a polygon representation) or curve parameters (such as radii of curvatures), which at least partially define the location of the boundaries within the image. Also such classification data which do not represent a pixelwise classification can be demagnified in order to increase the processing speed for determining the co-registration data. In particular, such a demagnification may result in a reduction of the numbers of parameters used for describing the boundaries of the segmented image regions. When demagnifying segmentation data which include parameters for boundary definition, the parameters may be scaled by a scaling factor which represents or is determined depending on the demagnification factor.

In the data processing system 2 (shown in FIG. 1) according to the first exemplary embodiment, the segmentation is performed using a machine learning algorithm which is configured to perform at least a portion of the operations for segmenting the image data. The machine learning may be performed by supervised and/or unsupervised learning. In the exemplary embodiment, the machine learning algorithm is implemented using an artificial neural network (ANN). It is conceivable, however, that the segmentation of the image data is performed using other segmentation techniques than machine learning. By way of example, the segmentation may be at least partially performed using image processing techniques, such as edge detection.

Figure 4:
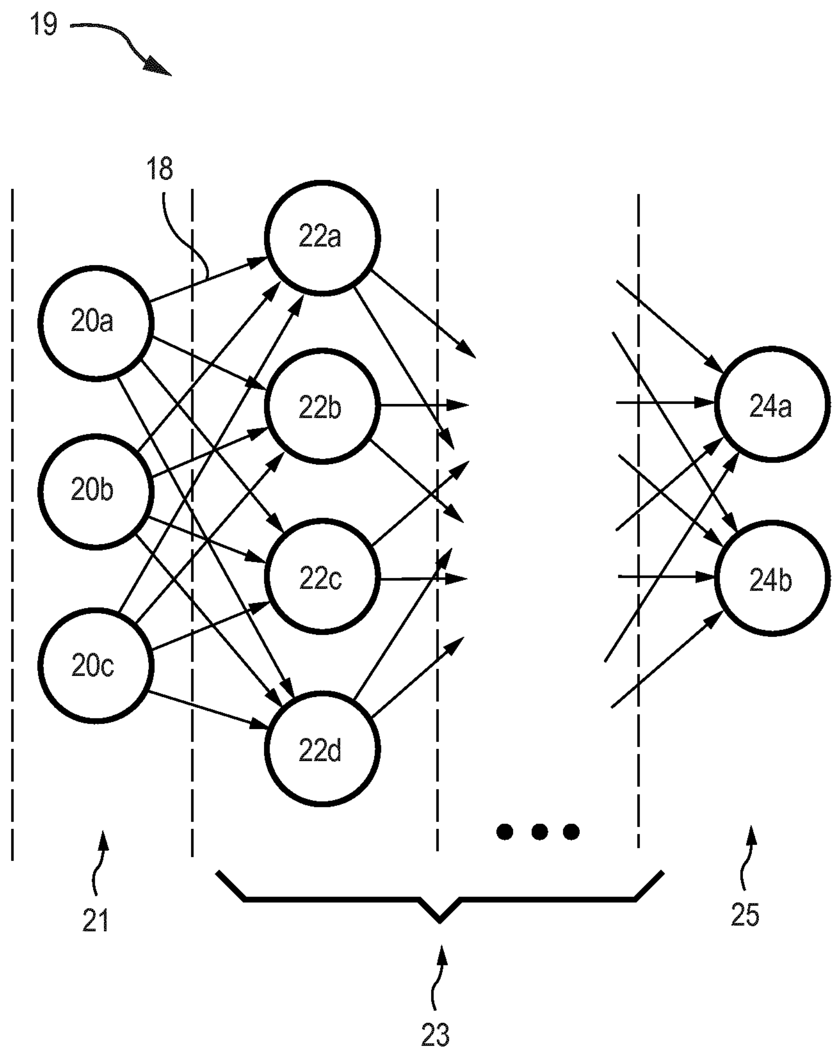
FIG. 4 is a schematic illustration of an artificial neural network implemented by the system for analysis of microscopic image data according to the first exemplary embodiment, which is shown in FIG. 1.

FIG. 4 is a schematic illustration of an ANN 19. The ANN 19 includes a plurality of neural processing units 20*a*, 20*b*, . . . 24*b*. The neural processing units 20*a*, 20*b*, . . . 24*b* are connected to form a network via a plurality of connections 18, each of which having a connection weight. Each of the connections 18 connects a neural processing unit of a first layer of the ANN 19 to a neural processing unit of a second layer of the ANN 19, which immediately succeeds or precedes the first layer. As a result of this, the artificial neural network has a layer structure which includes an input layer 21, at least one intermediate layers 23 (also denoted as hidden layer) and an output layer 25. In FIG. 4*a*, only one of the intermediate layers 23 is schematically illustrated. However, it is contemplated that the ANN 19 may includes more than 5, or more than 10, or more than 100 intermediate layers. Specifically, the ANN may be configured as a deep artificial neural network. The number of the layers may be less than 5,000, less than 2,000, or less than 1,000, or less than 500, or less than 300.

Additionally or alternatively, the ANN may be configured as a convolutional neural network. The term "convolutional neural network" may be defined herein as an artificial neural network having at least one convolutional layer. A convolutional layer may be defined as a layer which applies a convolution to the previous layer. The convolutional layer may include a plurality of neurons, wherein each neuron receives inputs from a pre-defined section of the previous layer. The pre-defined section may also be called a local receptive field. The weights for the pre-defined section may be the same for each neuron in the convolutional layer. Thereby, the convolutional layer may be defined by the two concepts of weight sharing and field accepting.

In order to determine the co-registration data depending on the extent of the fatty tissue within the images, the data processing system may be configured to implement Generalized Procrustes analysis and/or a numerical search algorithm, which varies one or more parameters of a translation vector and/or a rotation angle between the images of FIGS. 3A and 3B in order to determine a maximum overlap between the fatty tissue regions of both images. However, it is to be understood that the present disclosure is not limited to search algorithms for determining co-registration data. By way of example, one or more of the following procedures may be applied for determining the co-registration data depending on the (demagnified or not demagnified) segmentation data: surface registration algorithms like the iterative closest point algorithm, the head and hat algorithm, distance transform-based algorithms. Or images that optimize the mutual information between the classification results of pairs of tissue pieces in both images.

The determination of the co-registration data may be performed automatically or semi-automatically (i.e. requiring user interaction). Specifically, the data processing system 2 (shown in FIG. 1) may include a graphical user interface.

It has been shown by the inventors that a sufficiently high level of accuracy and robustness of the co-registration data can be obtained if the segmentation is performed based on image data which have a magnification equal to or greater than 5×, equal to or greater than 10× or equal to or greater than 20×. The resolution required depends on the detail that is necessary to distinguish between the predefined classes. At a resolution of 5×, the thin cell wall of fat cells is properly captured in the image.

Although the segmentation at such comparatively high magnifications may be time-consuming, the results of the segmentation can be re-used later on in the analysis of the image data.

The data processing system 2 (shown in FIG. 1) includes a graphical user interface which is configured to display, on the display device of the data processing system, a graphical representation of co-registered images depending on the co-registration data. By way of example, two or more images may be displayed superimposed on each other. This allows the user to compare features contained in both images. Additionally or alternatively, the graphical user interface may be configured to let the user select an image region in the first region and the graphical user interface indicates—using an identifier—the corresponding image region in at least one second image, depending on the co-registration data. Thereby, the graphical user interface generates graphical representations which are generated depending on the co-registration data. Additionally or alternatively, the data processing system may be configured to use the co-registration data to obtain a 3D reconstruction of the sample.

Figure 5A:
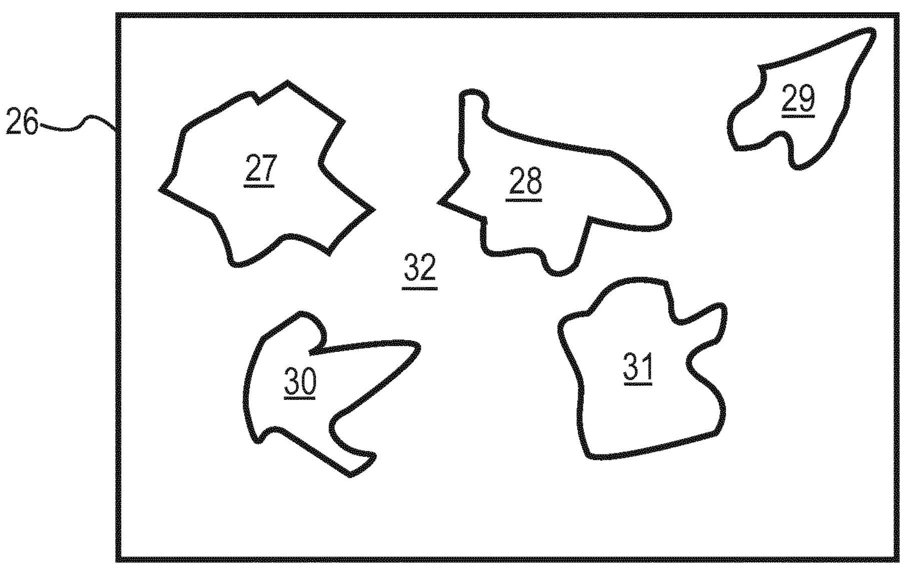
FIGS. 5A and 5B are schematic illustrations of images which are analyzed using a system for analysis of microscopic image data according to a second exemplary embodiment.
Figure 5B:
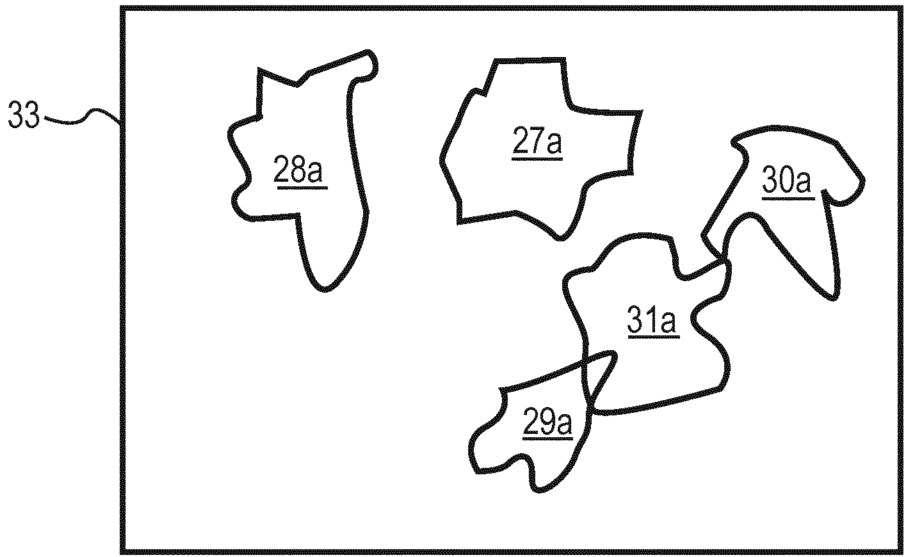

FIGS. 5A and 5B are schematic illustrations of images, which are analyzed using a system for analysis of microscopic image data according to a second exemplary embodiment. In a similar manner to the first exemplary embodiment shown in FIG. 1, the system according to the second embodiment includes a (stand alone or distributed) data processing system which implements a machine learning classifier (such as an artificial neural network) and which may be in signal communication with an image acquisition unit. Additionally, the system according to the second exemplary embodiment may include a portion or all of the features of the system according to the first exemplary embodiment.

FIGS. 5A and 5B show images acquired from a tissue sample which includes a plurality of tissue portions. FIG. 5A shows the tissue portions stained with a first stain and FIG. 5B shows the same tissue portions after restaining with a second stain. Due to the sample preparation steps between the image 26 of FIG. 5A and the image 33 of FIG. 5B and/or due to positional differences caused by the scanning of the samples, the tissue portions in the image 33 have different positions and orientation compared to the image 26. Further, in the image 33, the outer boundaries of the tissue portions are different compared to the image 26 making it difficult to determine a mapping between the tissue portions of both images from the shape of their outer boundaries.

The inventors have found that it is possible to efficiently and accurately determine mapping data for determining a mapping (i.e. a functional relationship) between the tissue portions of FIG. 5A and the tissue portions of FIG. 5B. The mapping data are determined using segmentation data which is determined in the same way as has been described above in connection with the first exemplary embodiment.

Also in a same manner as has been discussed in connection with the first exemplary embodiment, the predefined classes may include one or more classes representing regions formed by one or more tissue types. In particular, the predefined classes may include one or a combination of a first class representing image regions formed by fatty tissue, a second class representing image regions formed by non-fatty tissue, and a third class representing image regions which are free from sample material. The predefined classes may further include a class for artefacts. Further classes of tissue types are a class which represents image regions formed by epithelium tissue and a class formed by image regions formed by connective tissue.

Thereby, each of the tissue portions is segmented into one or a plurality of image regions, each of which representing a region, which is member of one or more of the predefined classes. It has been shown by the inventors that for each of the tissue portions, the segmentation data can be used to extract identification parameters, which allow identification of the same tissue portion in both images. The data processing system may be configured to determine, for each of the tissue portions a parameter depending on an area of an image region formed by one or more predetermined tissue types. By way of example, the system according to the second exemplary embodiment is configured to determine, for each of the tissue portions, one or a combination of an area of non-fatty tissue and/or an area of fatty tissue.

Additionally or alternatively, the data processing system may be configured to determine for each of the tissue portions a number of image regions within the respective tissue portion which are separated from each other and which represent image regions formed by one or more predetermined tissue types. By way of example, the data processing system may be configured to determine the number of regions formed by fatty tissue and/or the number of regions formed by non-fatty tissue. The inventors have shown that it is advantageous to count only those image regions if they have a size (measured in units of area) which exceeds a predefined threshold. By way of example, the threshold may be 0.25 $mm^2$.

Based on the determined identification parameters, it is possible to identify which tissue portion in the image 26 of FIG. 5A corresponds to which tissue portion in the image 33 of FIG. 5B.

The data processing system may further be configured to use an identified pair of tissue portions in two images to determine one or more parameters of a transformation vector between both tissue portions. This transformation vector can be used to identify, refine and/or correct mapped pairs of other tissue portions.

Further, the data processing system may be configured to determine and/or refine, depending on the mapping data, the co-registration data for co-registering the corresponding images. By way of example, the data processing system may be configured to use the mapping data to determine an estimate for one or more parameters (such as a translation vector) for the co-registration data. This is useful if in both images, the tissue portions have substantially the same position relative to each other as it is the case for many pathology samples. By way of example, the data processing system may be configured to determine, for each of the tissue portions, a position of a center of mass within the image. The translation vector between two images may be determined depending on the positions of the center of mass of one or more of pairs of the tissue portions which were mapped using the mapping data. By way of example, depending on the centers of mass, an initial estimation for the translation vector between the image regions may be obtained. Additionally or alternatively, one or more parameters of co-registration data for co-registering a pair of mapped image regions and/or for co-registering the corresponding images may be obtained using Generalized Procrustes analysis.

The graphical user interface may be configured to display on the display device one or more graphical representations depending on the mapping data. By way of example, as is illustrated in FIGS. 5A and 5B, the graphical user interface may display for each of the tissue portions a number so that tissue portions in different images which are mapped by the mapping data have the same number.

Figure 6:
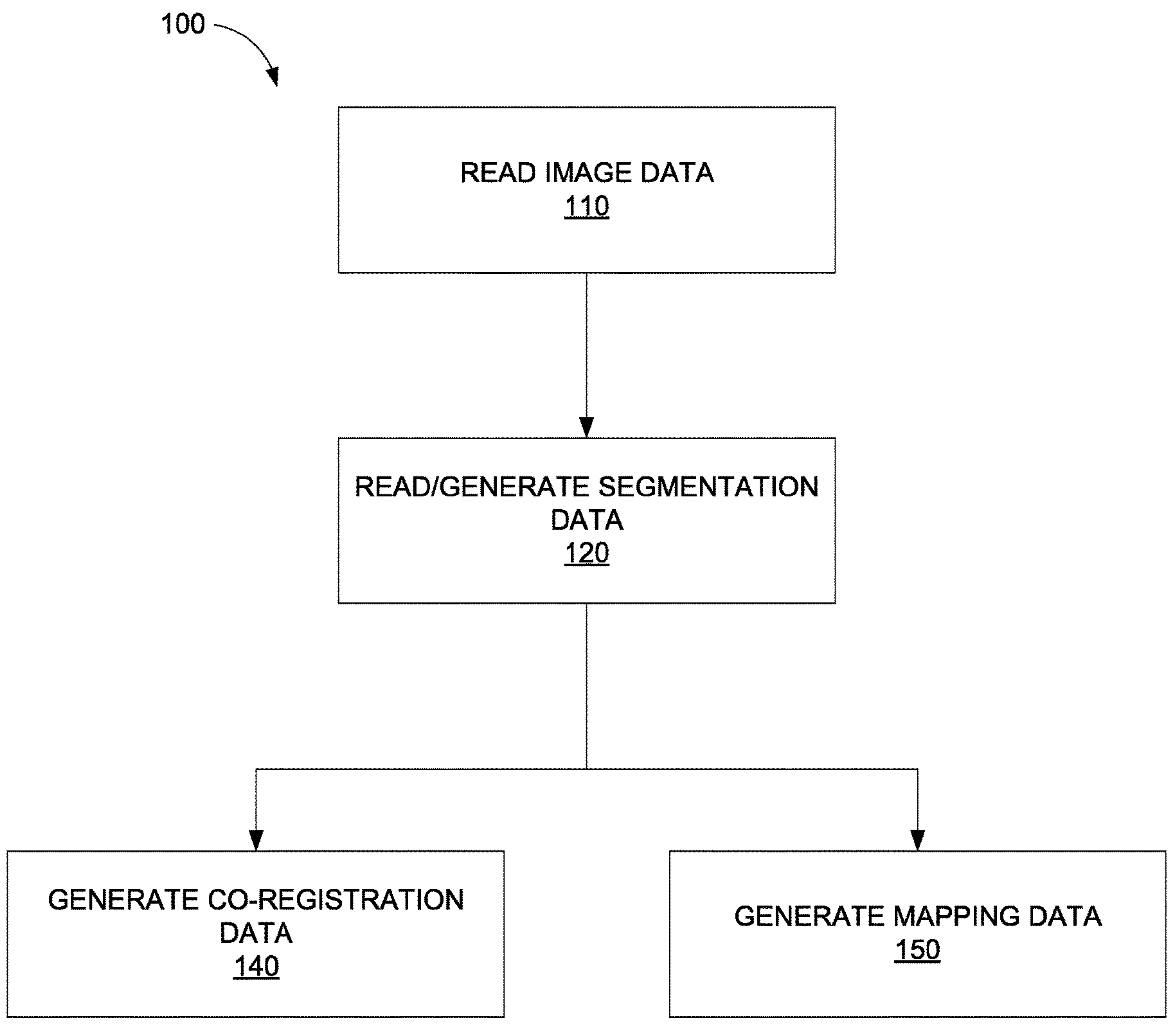
FIG. 6 is a flowchart of an exemplary method for analyzing microscopic data according to an exemplary embodiment.

FIG. 6 is a schematic illustration of a method 100 for analyzing microscopic image data using a data processing system 2 (shown in FIG. 1). The method 100 includes reading (110), by the data processing system, image data representing a plurality of images. The image data may be read from a storage device of the data processing system or from an image acquisition unit, which is configured to receive one or more samples and to acquire image data from the samples. The method further includes reading and/or generating 120, by the data processing system 2, segmentation data for each of the images. The segmentation data may be generated by a classifier, which may be implemented by the data processing system 2 or which may run on an external data processing system (not shown in FIG. 1) which transmits the segmentation data to the data processing system 2. For each of the images, the segmentation data are indicative of a segmentation of at least a portion of the respective image into one or more image regions so that each of the image regions is a member of one or more predefined classes of image content. The method 100 further includes at least one of: (a) generating (140) co-registration data using at least portions of the segmentation data for co-registering at least image portions of different ones of the images; and (b) generating (150) mapping data using at least portions of the segmentation data for mapping between image regions of different images. In view of the foregoing, a system and method is provided which allows efficient analysis of images acquired from cells.

The above embodiments as described are only illustrative, and not intended to limit the technique approaches of the present invention. Although the present invention is described in details referring to the preferable embodiments, those skilled in the art will understand that the technique approaches of the present invention can be modified or equally displaced without departing from the protective scope of the claims of the present invention. In the claims, the word "comprising" does not exclude other elements or steps, and the indefinite article "a" or "an" does not exclude a plurality. Any reference signs in the claims should not be construed as limiting the scope.

The invention claimed is:

1. A system for analysis of microscopic image data representing a plurality of images acquired from cells, the system comprising a data processing system which is configured to:

generate segmentation data for each of the images using a classifier of an artificial neural network, the classifier configured to perform sliding window classification, wherein for each of the images, the segmentation data are indicative of a segmentation of at least a portion of the respective image into three or more image regions so that each of the image regions is a member of a different one or more of a plurality of different predefined classes of image content, the plurality of different predefined classes of image content representing a plurality of different tissue types, wherein the plurality of different predefined classes comprise: (i) a class representing image regions formed by fatty tissue; (ii) a class representing image regions which are free from sample material; and (iii) a class representing image regions formed by non-fatty tissue;

generate co-registration data using at least portions of the segmentation data for co-registering at least portions of different images; and generate mapping data using at least portions of the segmentation data for mapping between a plurality of image regions of different images, wherein generating mapping data comprises determining, for each of the image regions, an identification parameter for identifying the respective image region from among the remaining image regions contained in the same image, and wherein the identification parameter is determined depending on the segmentation data.

2. The system of claim 1, wherein a magnification of the segmentation data is lower than a magnification of the image data.

3. The system of claim 1, wherein the segmentation data comprise, for each of a plurality of pixels of the images, binary or probabilistic pixel classification data for providing a pixelwise classification of the pixels into one or more of the pre-defined classes.

4. The system of claim 1, wherein:

the classifier is based on supervised and/or unsupervised learning; and the classifier is configured for performing at least a portion of a segmentation of the image data, wherein the segmentation generates the segmentation data using at least a portion of the image data.

5. The system of claim 1, wherein the image regions represent isolated tissue portions.

6. The system of claim 1, wherein the data processing system comprises a graphical user interface;

wherein the data processing system is configured to present to the user a one or more graphical representations which are generated depending on the co-registration data and/or depending on the mapping data.

7. The system of claim 1, wherein the system comprises an image acquisition unit which is configured to:

receive one or more samples, each of which comprising the cells; and acquire the image data from the one or more samples.

8. A method for analyzing microscopic image data representing a plurality of images acquired from cells using a data processing system, the method comprising:

generating, by the data processing system, segmentation data for each of the images using a classifier of an artificial neural network, the classifier configured to perform sliding window classification, wherein for each of the images, the segmentation data are indicative of a segmentation of at least a portion of the respective image into three or more image regions so that each of the image regions is a member of a different one or more of a plurality of different predefined classes of image content, the plurality of different predefined classes of image content representing a plurality of different tissue types, wherein the plurality of different predefined classes comprise two or more of: (i) a class representing image regions formed by fatty tissue; (ii) a class representing image regions which are free from sample material; and (iii) a class representing image regions formed by non-fatty tissue;

generating co-registration data using at least portions of the segmentation data for co-registering at least image portions of different images; and generating mapping data using at least portions of the segmentation data for mapping between a plurality of image regions of different images, wherein generating mapping data comprises determining, for each of the image regions, an identification parameter for identifying the respective image region from among the remaining image regions contained in the same image, and wherein the identification parameter is determined depending on the segmentation data.

9. The method of claim 8, further comprising:

generating a first image of the images and a second image of the images, wherein the first image shows a sample being stained using a first stain and the second image shows a different and/or the same sample being stained using a second stain so that the first and second images show different sample stainings.

10. A non-transitory computer readable medium having stored thereon a program element for analysis of microscopic image data representing a plurality of images acquired from cells, wherein the analysis is performed using a data processing system, wherein the program element, when being executed by a processor of the data processing system, is adapted to carry out:

generating, by the data processing system, segmentation data for each of the images using a classifier of an artificial neural network, the classifier configured to perform sliding window classification, wherein for each of the images, the segmentation data are indicative of a segmentation of at least a portion of the respective image into three or more image regions so that each of the image regions is a member of a different one or more of a plurality of different predefined classes of image content, the plurality of different predefined classes of image content representing a plurality of different tissue types, wherein the plurality of different predefined classes comprise two or more of: (i) a class representing image regions formed by fatty tissue; (ii) a class representing image regions which are free from sample material; and (iii) a class representing image regions formed by non-fatty tissue;

generating co-registration data using at least portions of the segmentation data for co-registering at least image portions of different images; and generating mapping data using at least portions of the segmentation data for mapping between a plurality of image regions of different images, wherein generating mapping data comprises determining, for each of the image regions, an identification parameter for identifying the respective image region from among the remaining image regions contained in the same image, and wherein the identification parameter is determined depending on the segmentation data.

11. The non-transitory computer readable medium of claim 10, wherein a magnification of the segmentation data is lower than a magnification of the image data.

12. The non-transitory computer readable medium of claim 10, wherein the segmentation data comprise, for each of a plurality of pixels of the images, binary or probabilistic pixel classification data for providing a pixelwise classification of the pixels into one or more of the pre-defined classes.

13. The non-transitory computer readable medium of claim 10, wherein the program element is adapted to further carry out:

performing at least a portion of a segmentation of the image data, wherein the segmentation generates the segmentation data using at least a portion of the image data.

14. The non-transitory computer readable medium of claim 10, wherein the image regions represent isolated tissue portions.

* * * * *